United States Patent [19]

Dunn et al.

[11] Patent Number: 5,035,675

[45] Date of Patent: Jul. 30, 1991

[54] CONVERTIBLE COMBINE ROTOR

[75] Inventors: Neil C. Dunn, Trenton, Mo.; Richard E. McMillen, Plainfield; Jon E. Ricketts, Viola, both of Ill.

[73] Assignee: J. I. Case Company, Racine, Wis.

[21] Appl. No.: 482,008

[22] Filed: Feb. 16, 1990

Related U.S. Application Data

[63] Continuation-in-part of Ser. No. 758,313, Jul. 24, 1985, abandoned.

[51] Int. Cl.⁵ ............................................. A01F 12/22
[52] U.S. Cl. ........................................ 460/62; 460/72; 460/122; 56/2; 56/14.6
[58] Field of Search ................... 460/62, 46, 69, 66, 460/68, 70, 71, 72, 77, 83, 121, 122, 145; 56/2, 14.5, 14.6, 16.4, 16.5

[56] References Cited

U.S. PATENT DOCUMENTS

| | | |
|---|---|---|
| 1,571,128 | 1/1926 | Lucas . |
| 2,349,380 | 5/1944 | Rietz . |
| 2,361,633 | 10/1944 | Jones ................................... 460/71 |
| 3,079,924 | 3/1963 | Dietrich .............................. 460/71 |
| 3,664,100 | 5/1972 | Rowland-Hill ..................... 56/14.6 |
| 4,178,943 | 12/1979 | West .................................... 56/14.6 |
| 4,266,560 | 5/1981 | Powell et al. ........................ 56/14.6 |
| 4,362,168 | 12/1982 | Hengen . |
| 4,505,279 | 3/1985 | Campbell et al. . |
| 4,889,517 | 12/1989 | Strong et al. ........................ 460/71 |
| 4,946,419 | 8/1990 | Cromheecke et al. .............. 460/71 |

FOREIGN PATENT DOCUMENTS

0528907 1/1977 U.S.S.R. .
0650551 3/1979 U.S.S.R. .

Primary Examiner—Terry Lee Melius
Attorney, Agent, or Firm—Dressler, Goldsmith, Shore, Sutker & Milnamow, Ltd.

[57] ABSTRACT

A rotor for a rotary threshing combine which is readily adjustable to provide a great variety of threshing patterns to suit the particular crops and conditions of use. The rotor drum has a plurality of mounting lugs affixed thereto in an array that includes longitudinal, circumferential, and helical rows. A variety of differently shaped threshing elements, each designed for efficient operation under particular conditions, is provided and said elements are selectively and interchangeably and releasably connectable to the mounting lugs.

20 Claims, 8 Drawing Sheets

CONVERTIBLE COMBINE ROTOR

This application is a continuation-in-part of application Ser. No. 758,313, filed July 24, 1985 entitled "Convertible Combine Rotor," now abandoned.

TECHNICAL FIELD

This invention relates generally to agricultural threshing machines such as combines and, more particularly, to the threshing rotors utilized in rotary combines.

BACKGROUND OF THE INVENTION

A common and well known form of threshing machine is the rotary combine. In a rotary combine, the grain or other crop harvested in the field is fed by a conveyor section into the threshing section containing the threshing rotor. The rotor itself is an elongated cylindrical member which may be positioned transversely or longitudinally of the direction of travel of the combine, but usually the latter. Thresher vanes or bars are permanently affixed to the outer surface of the rotor, usually arranged in a simple helical pattern, and it is those elements which do the work of separating the edible grain from the remaining plant material. Various agitators, shakers, graders, and screens are then utilized to further separate the different plant components.

In rotary threshing, it is customary to use different rotors for harvesting different crops. For example, a rotor having long straight and helical surface elements is most efficient for the harvesting of small grain, corn, and soybeans. On the other hand, a rotor having short helical sections is most efficient for the harvesting of rice, edible beans, and damp weedy crops. Use of a rotor mismatched to the particular crop being harvested can result in both inefficient waste of the primary crop, frequent jamming of the rotor and down time for the entire combine.

A typical combine is, of course, a rather massive and expensive vehicle. The rotor of a rotary combine is itself quite heavy and unwieldy, weighing far in excess of what might be liftable manually by a number of people. Even assuming then that a number of different rotors are at hand, the changing of one rotor for another in a given combine is a difficult operation requiring the use of auxiliary lifting cranes, or the like. Frequently, the practical effect of this situation is to severely limit the harvesting applications for which a combine can be used.

It would be most desirable if a single rotary combine could be readily adapted or converted for a wide variety of harvesting applications as required. Similarly, it would be most desirable if the ready convertibility of the combine could be accomplished without removal of the threshing rotor therefrom.

SUMMARY OF THE INVENTION

The present invention provides a combine which is readily convertible for use with any crops to overcome the problems described above. The convertibility of the combine is readily achieved without requiring removal of the rotor from the combine.

Briefly, the invention comprises a cylindrical drum rotor of a basically conventional welded construction that when placed in the combine extends longitudinally in the direction of travel of the combine, which is thus generally referred to as an axial-flow rotor.

In one of the embodiments, in order to have total latitude as to the configuration and orientation of the thresher elements to be disposed on the rotor, the outer surface of the rotor has none of the permanently affixed helical or straight bars which were heretofore conventional. Instead, the rotor has a plurality of upstanding lugs welded to its outer surface and over the full longitudinal length thereof. The lugs are arranged and spaced to provide an array of patterns including helical rows, longitudinal rows, and circumferential rows over the entire surface of the drum.

Each of the lugs is formed with means for accommodating releasable attachment thereto of separate thresher elements. Cooperating with the lugs are a variety of specially and differently shaped thresher elements.

The rotor of the present invention is generally referred to as a specialty rotor which usually uses a combination of spiked and non-spiked rasp bars. This combination provides an excellent arrangement for tough harvesting conditions. If material flow through the combine is a problem, non-spiked rasp bars are installed over the concave area and in place of the straight separator bars in the separator area.

Another example of the versatility available with a specialty rotor is when it is desired to switch from tough harvesting conditions to corn, straight separator bars can be substituted for horizontally aligned pairs of spiked or non-spiked rasp bars. In such situations, straight separator bars improve material flow allowing full separation.

Some elements are adapted to be attached to a single lug. Other elements comprise straight bars adapted to be connected to two lugs. Still other elements comprise segments of a helix and are adapted to be mounted to a plurality of angularly related lugs. In addition to the various configurations in which they can be positioned, the thresher elements may be formed with a variety of outer working surfaces. The various thresher elements may be mounted on and disconnected from the lugs so that any desired pattern of threshing may be readily achieved to suit the particular crop and harvesting conditions being encountered. Mounting and removal of the thresher elements is easily achieved with the use of common nuts and bolts and wrenches. The invention thus may be said to provide a combine rotor which is universally convertible for any desired operation.

In a second embodiment the rotor is divided into two sections, each extending approximately one-half the length of the rotor. With this arrangement, the entry or front half of the rotor which is the portion initially engaged by the crop entering the combine is of a conventional construction to handle most crops, including grains, corn, soybeans, etc. This section thus consists of conventional, permanently affixed helical and straight bars. The cylindrical surface is otherwise clear of any projections. Thus, in this area, there is relatively mild threshing of the crops being handled.

However, in the exit or back half of the rotor, the rotor surface has a plurality of upstanding lugs spaced to provide an array of patterns including helical rows, longitudinal rows, and circumferential rows around the periphery of the back half of the rotor. This versatility increases machine production in all conditions and allows an operator to harvest many more varieties without a rotor change.

In this area, the various thresher elements may be mounted on and disconnected from the lugs to obtain the desired pattern of threshing. In this section, a more aggressive threshing normally occurs and can be configured to treat crops in the specific way desired as determined by the crop being handled. For example, if wadding were to occur in the entry position of the rotor as a result of handling wet crops, the more aggressive action provided by the thresher elements at the rear section helps to overcome this problem.

Numerous other advantages and features of the present invention will become readily apparent from the following detailed description of the invention, from the claims, and from the accompanying drawings.

BRIEF DESCRIPTION OF THE DRAWINGS

In the accompanying drawings forming a part of the specification, and in which like numerals are employed to designate like parts throughout the same.

DETAILED DESCRIPTION OF THE INVENTION

Figure 1:
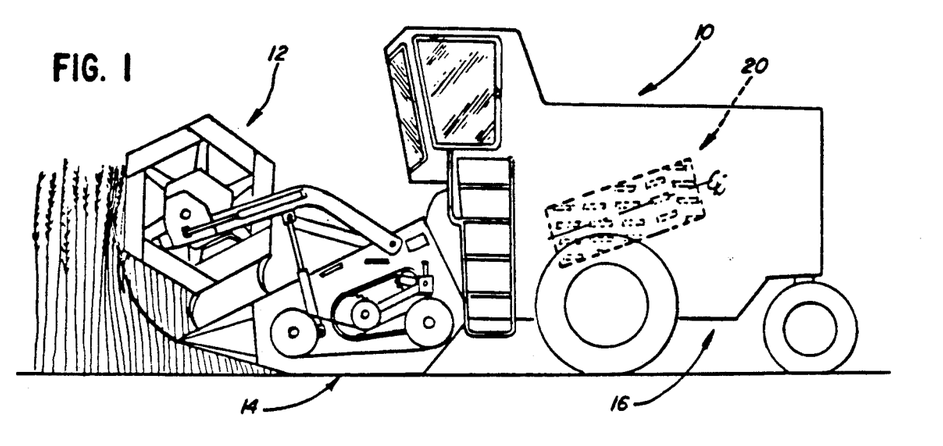
FIG. 1 is a diagrammatic view of an agricultural combine illustrating the general location of the threshing rotor therein.

Referring with greater particularity to the various figures of the drawings, it will be seen that the reference numeral 10 indicates generally an agricultural combine as utilized in a typical harvesting and threshing operation. The combine 10 comprises the conventional portions, including a reel 12 for raking the crop toward the header section 14 which carries a cutter head (not shown) and a conveyor (not shown) for transporting the severed crop rearwardly toward the vehicle 16 which contains the threshing section. A threshing rotor 20 embodying the principles of the invention is rotatably mounted in the vehicle 16 and suitable drive means (not shown) are provided for rotating the rotor and actuating the other movable members of the combine in conventional fashion. In the embodiment illustrated, the rotor 20 is mounted with its longitudinal axis in substantial alignment with the direction of travel of the combine which construction is commonly referred to in the trade as an axial flow combine.

Figure 2:
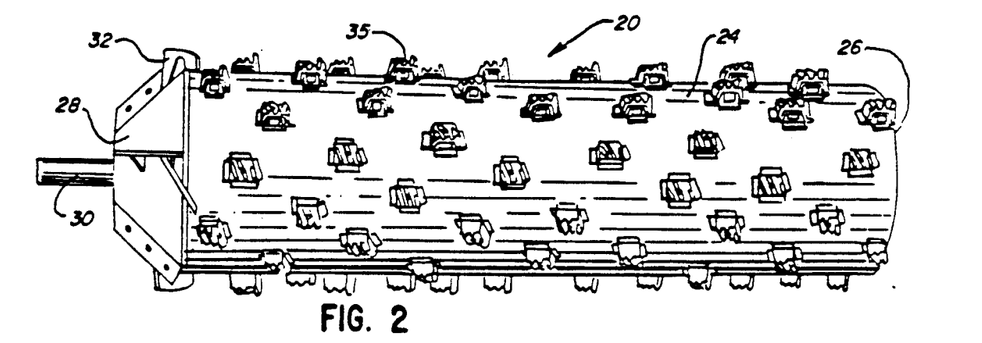
FIG. 2 is an elevational view of a threshing rotor embodying the principles of the invention removed from the combine.

Rotor 10 comprises an elongated drum 22 having a cylindrical wall 24, a rear end wall 26, and a front end wall 28. Projecting from the front end wall 28 are a mounting shaft 30 and a plurality of vanes or impeller blades 32 which serve to convey the severed crop material rearwardly to be acted upon by the outer surface of the rotor.

Figure 3:
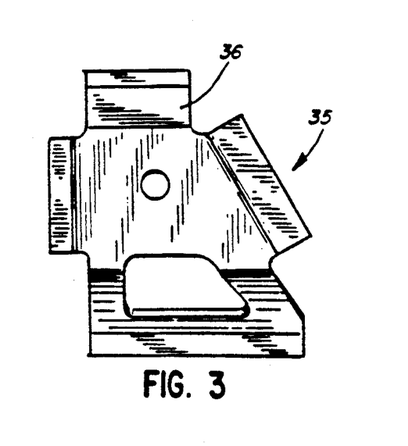
FIG. 3 is a top plan view of a mounting lug.
Figure 4:
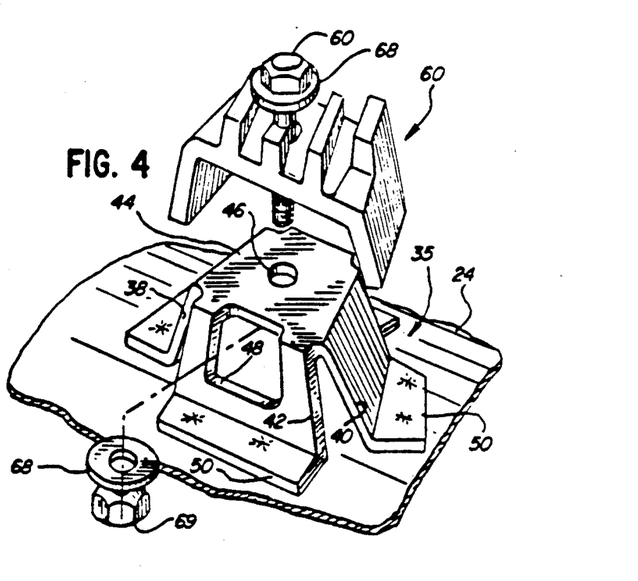
FIG. 4 is an exploded, fragmentary, perspective view of a mounting lug and associated thresher element.

A plurality of mounting lugs 35 are rigidly secured, as by welding, to the cylindrical wall 24. As seen in FIGS. 3 and 4 of the drawings, each mounting lug 35 comprises an open, frusto-pyramidal member having a front or leading wall 36, sidewalls 38 and 40, and a rear or trailing wall 42, said walls tapering upwardly toward an integral top wall 44. Top wall 44 is provided with a connector-receiving hole 46 and a rear wall 42 is formed with an access opening 48 dimensioned to permit entry into the interior of the lug 35 by a tool or finger for purposes which will become apparent as the description proceeds. Each of the walls 36, 38, 40 and 42 comprises a bottom flange 50 which is rigidly secured to the cylindrical wall 24 by suitable welding.

Figure 5:
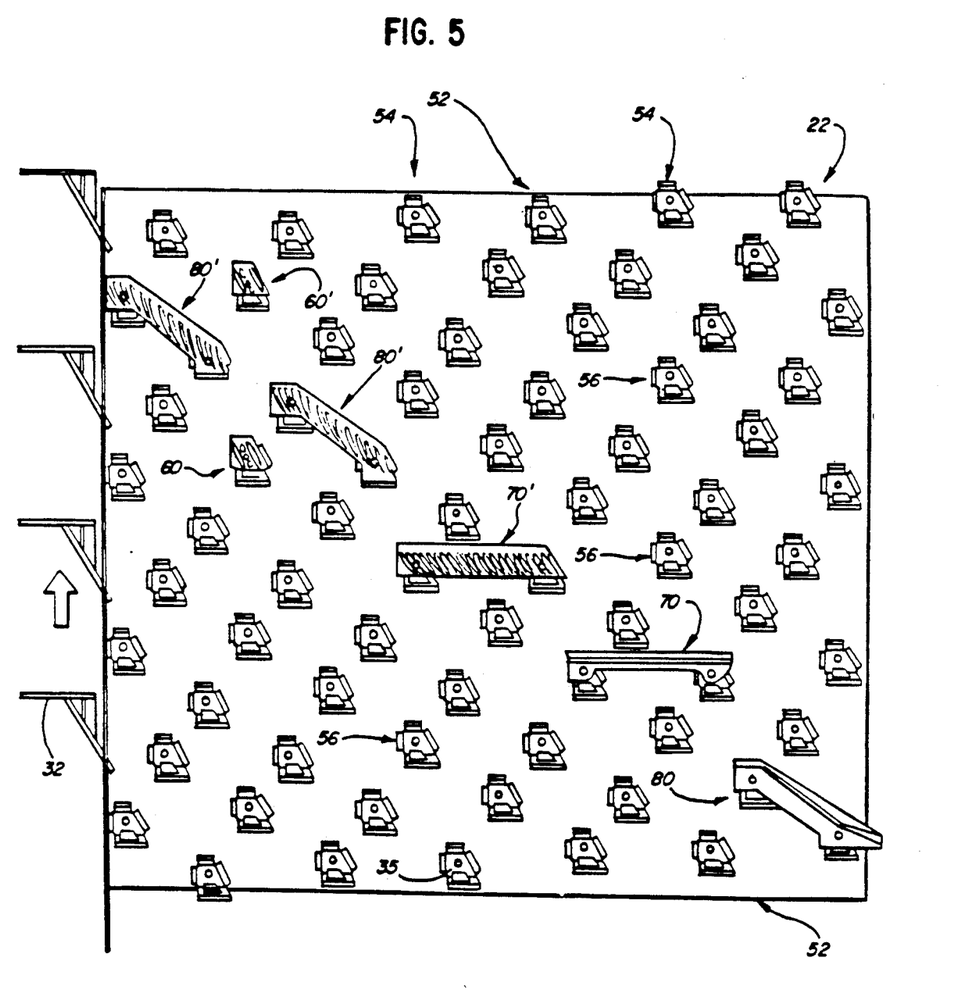
FIG. 5 is a plan, developed view of the rotor drum.

Mounting lugs 35 are secured to the cylindrical wall 24 to provide an array of helical rows, circumferential rows and longitudinal rows over the entire surface of said wall. The preferred arrangement of the lugs 35 is illustrated in FIG. 5 of the drawings. It will there be seen that the lugs 35 form helical rows such as 52, circumferential rows such as 54, and staggered longitudinal rows such as 56. Rotation of the drum 22 would normally be in the upward direction, as indicated by the arrow in FIG. 5, so that the closed, front walls 36 of the lugs 35 are leading and contact the crop material first.

Figures 6, 11:
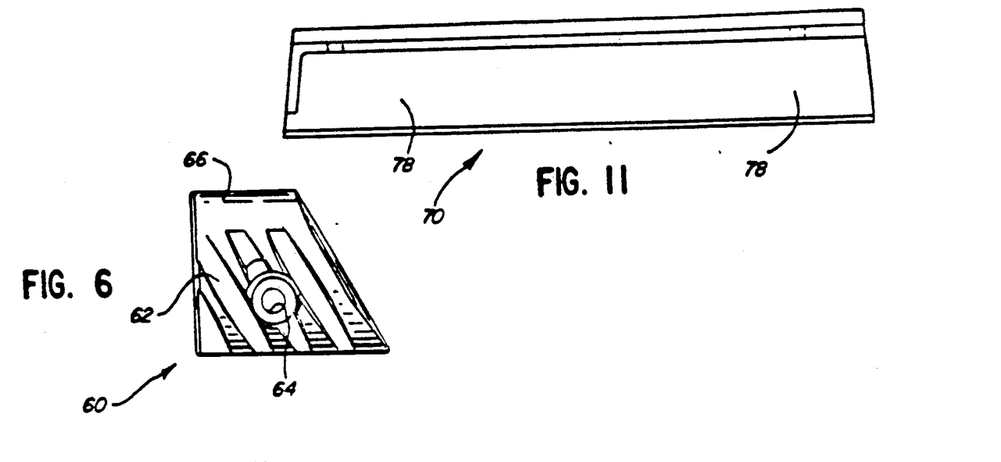
FIGS. 6 through 17 are top plan and side elevational views, respectively, of six representative thresher element connectable to the rotor.
Figures 7, 8, 10:
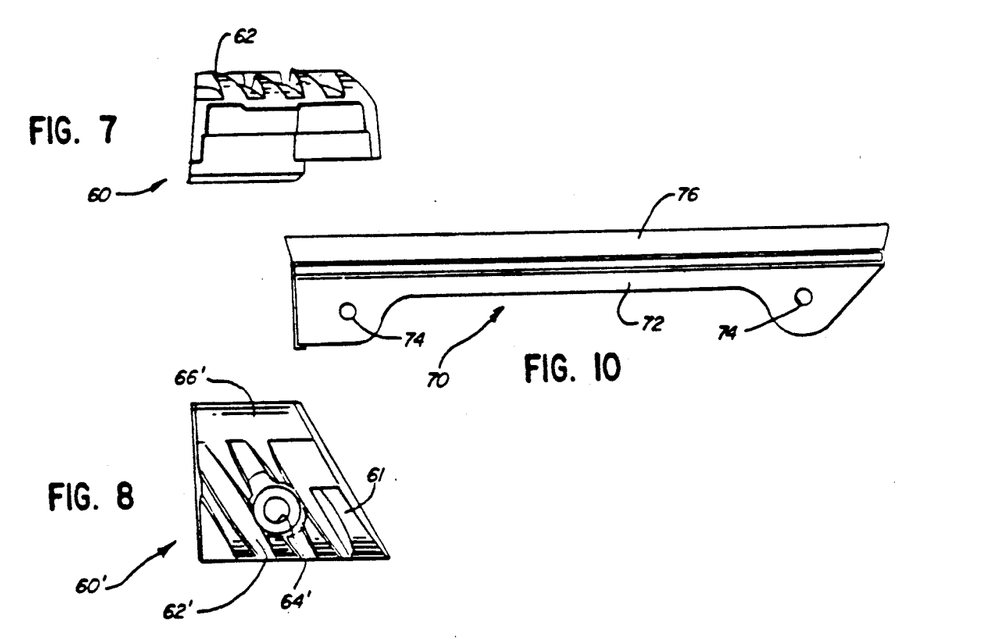

Thresher elements of various forms and shapes are selectively connectable to the lugs 35 as required. In FIGS. 6 and 7, there is shown a bar rasp 60 having a serrated top wall 62 formed with a connector-receiving hole 64 therein. Rasp bar 60 has a tapered front wall 66 and comprises a generally frusto-pyramidal form which opens to the rear thereof and is of complementary configuration with the lug 35. The rasp bar 60 thus may be connected in contour-accommodating relationship to a lug 35 with suitable connectors such as bolts 67, washers 68 and nuts 69, with the lug opening 48 providing access for a suitable tool for the connection or removal of such connectors.

Figure 9:
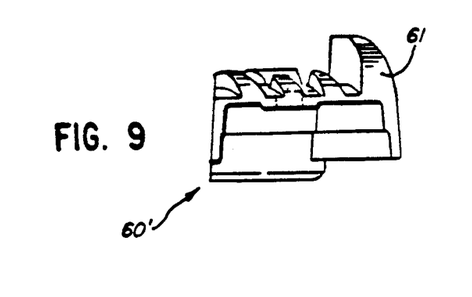

FIGS. 8 and 9 illustrate a rasp bar 60' of similar configuration and operation, but having an additional rear spike 61 projecting from the top wall 62'.

FIGS. 10 and 11 illustrate a straight bar 70 comprising an elongated top wall 72 formed with a pair of connector-receiving openings 74,74, a solid front wall 76, and a pair of hollow end segments 78,78 adapted to fit over a pair of lugs 35 in substantial contour accommodating relationship. As seen in FIG. 5, the bar 70 is connectable to a pair of longitudinally aligned lugs 35.

Figures 12, 16:
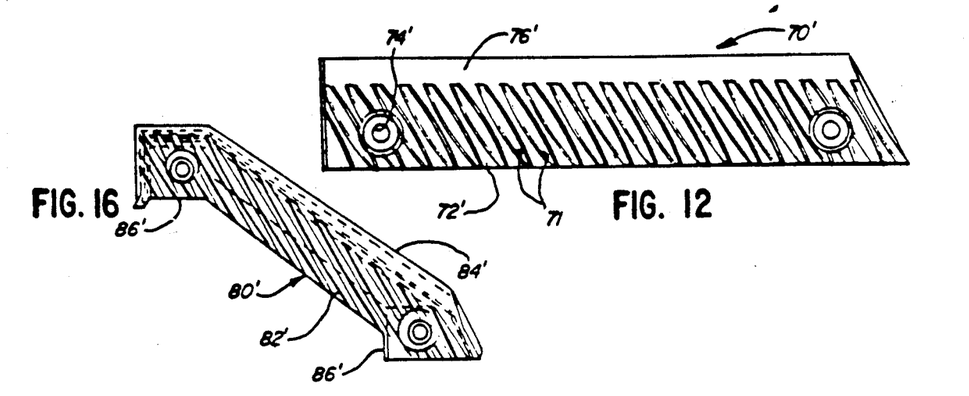
Figure 13:
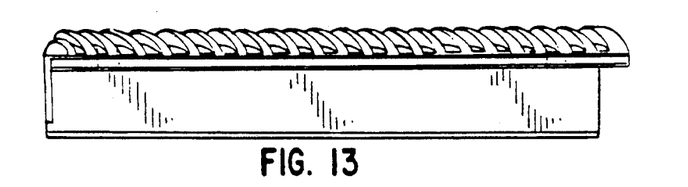

In FIGS. 12 and 13, there is illustrated a straight bar 70' of substantially identical configuration and operation, but in which the top wall 72' is formed with rasps or serrations 71.

Figure 14:
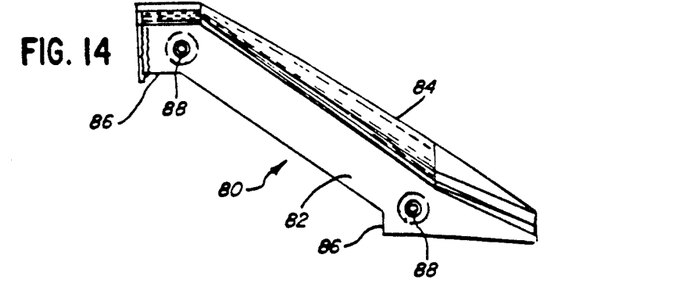
Figure 15:
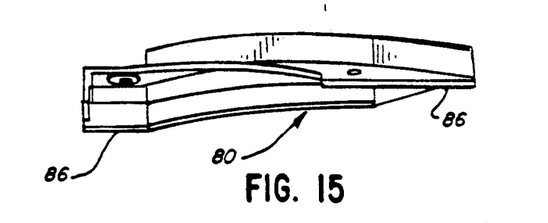

FIGS. 14 and 15 illustrate a helical kicker bar 80 comprising a top wall 82, a solid front wall 84, and a pair of end portions 86,86 adapted to receive therein a pair of lugs 35. Top wall 82 is formed with connector-receiving openings 88,88. It will be noted that the kicker bar 80 is formed with curvature as the arc of a helix complementary to the helical curvature of the cylindrical wall 24. As illustrated in FIG. 5, the kicker bar 80 thus may be connected to a pair of helically aligned lugs 35.

Figure 17:
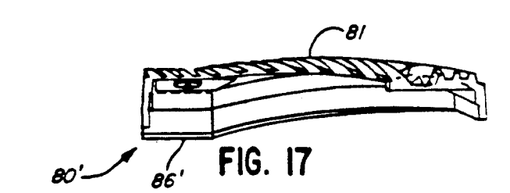

In FIGS. 16 and 17, there is illustrated a helical rasp-kicker bar 80' of substantially identical configuration and operation, but in which the top wall 82' is formed with rasps or serrations 81.

The various thresher elements described above can obviously be attached in whatever manner desired to the rotor due to the disposition of the lugs around the periphery of the rotor wall. It can be appreciated that if the operator wants the rotor to act very aggressively on the crop, spiked or non-spiked rasp bars, and the like, would be employed, whereas, if mild threshing is desired, straight separator bars would be attached. The operator has the freedom to change the threshing elements quickly and easily to accommodate different crops without having to change rotors.

Figure 18:
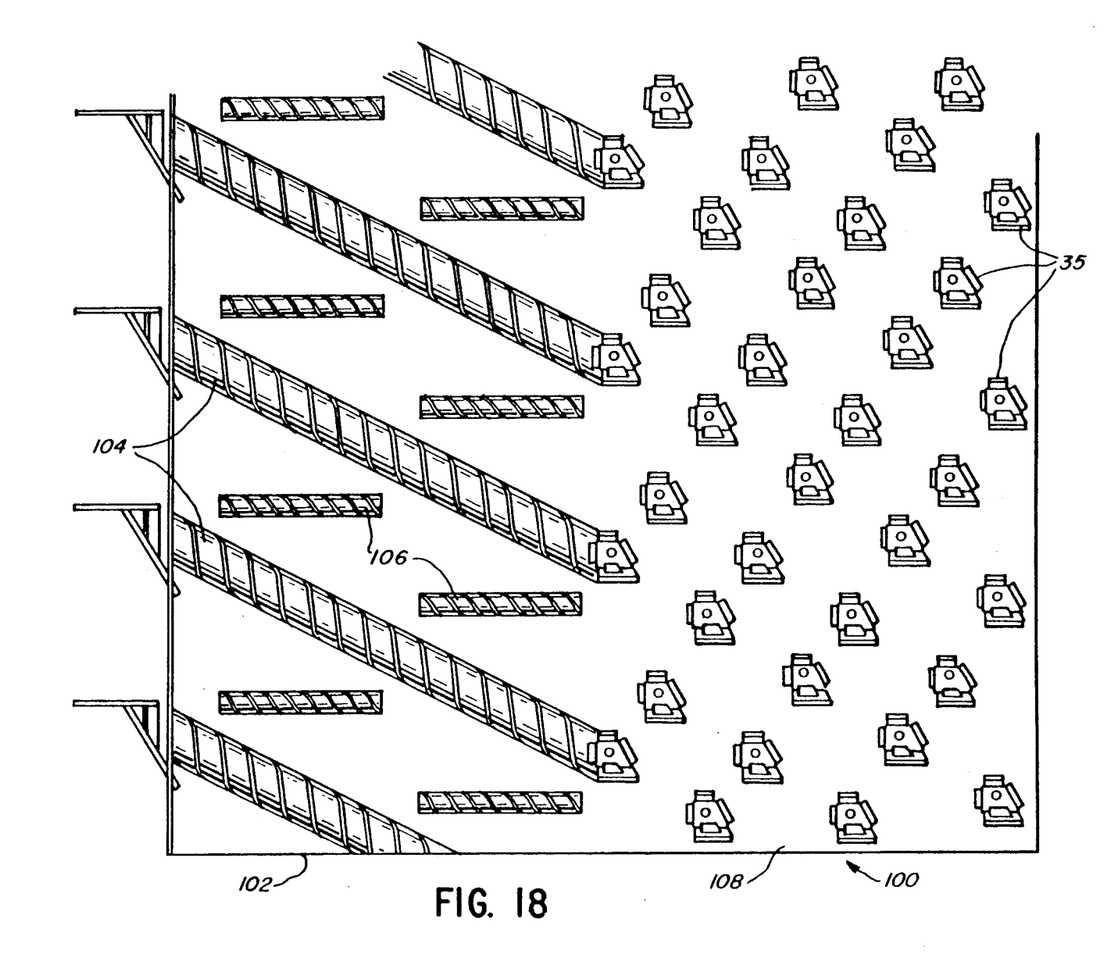
FIGS. 18-21 are plan, developed views of four rotor embodiments in which the left or entry half has conventional helical and straight bars attached thereto and the rear or exit half illustrates a blank pattern and three different patterns of threshing elements disposed on the mounting lugs.

Referring now to FIG. 18, there is illustrated in a plan, developed view a rotor 100 in which the front half 102 employs spaced relatively long helical bars 104 and straight bars 106 which is known in the industry as the configuration of a standard grain rotor. These bars are disposed in a conventional pattern and are designed to handle a majority of conventional crops to be harvested by the combine incorporating the rotor. This half or entry section 102 of the rotor 100 threshes material in a gentle fashion. There are no other projections in this position of the rotor. If a wet crop is being handled, there can be wadding of the material, which substantially reduces the efficiency of the threshing. To overcome this wadding possibility, or to obtain a more specific aggressive threshing where necessary for difficult separating, a different configuration and orientation of the threshing bars is desirable in the exit section 108 of the rotor. To this end, the exit section of the rotor includes mounting lugs 35 that are secured to the cylindrical wall 112 to provide an array of helical rows, circumferential rows, and longitudinal rows over the entire surface of this exit section. Thus, in this combination rotor, there is the combined advantage of the entry section handling a majority of crops in a gentle fashion, which may be desired, while the exit section of the rotor can be configured to have whatever pattern desired, such as a continuation of the pattern in the entry section for gentle threshing, or a different orientation and more aggressive threshing arrangement if such is called for.

Figure 19:
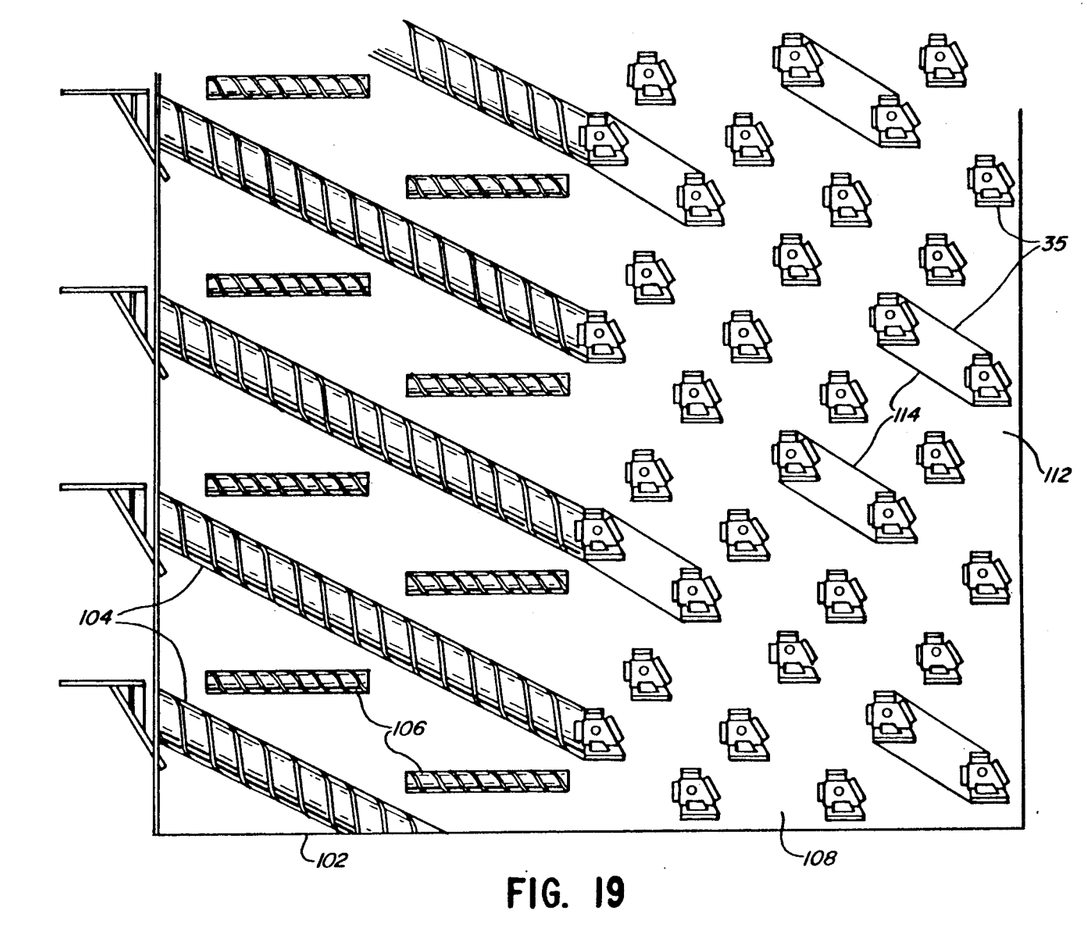

In FIG. 19, there are located a series of generally short helical bars 114 in the rotor section 108 which is an arrangement used when the material is to exit quickly from the rotor. The threshing would have been completed within the first 30% of the rotor. This would be used for sunflowers and alfalfa, to name a few. Even more helical bars could be added.

Figure 20:
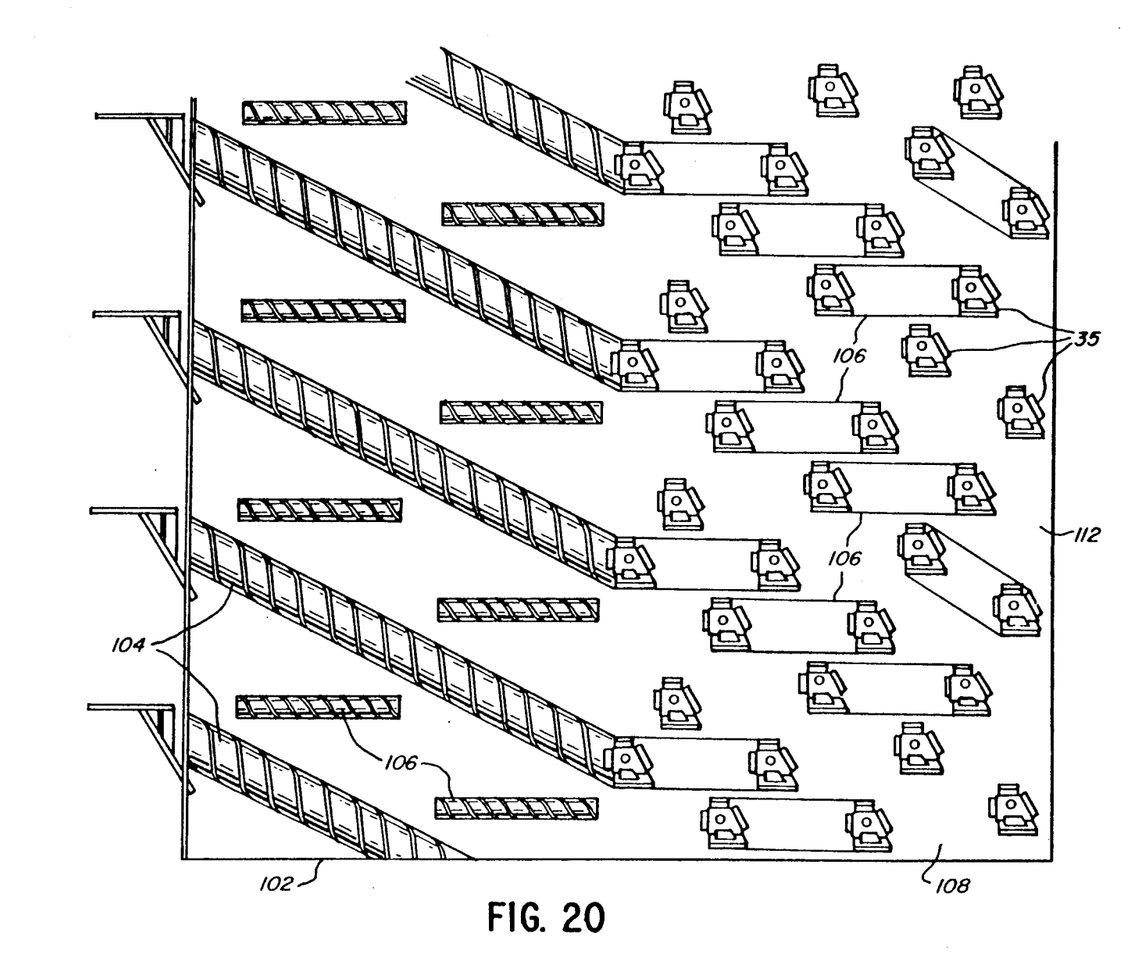

In FIG. 20, there is shown an arrangement of primarily straight bars 106 in the rotor section 108. This configuration greatly slows the material speed. This would be used in crops that had low volumes of viney straw, but required more threshing and stirring. One such crop would be high moisture corn. The operator could leave his concave more open, thus threshing in a more gentle manner and be certain that the back half would complete the threshing and separating.

Figure 21:
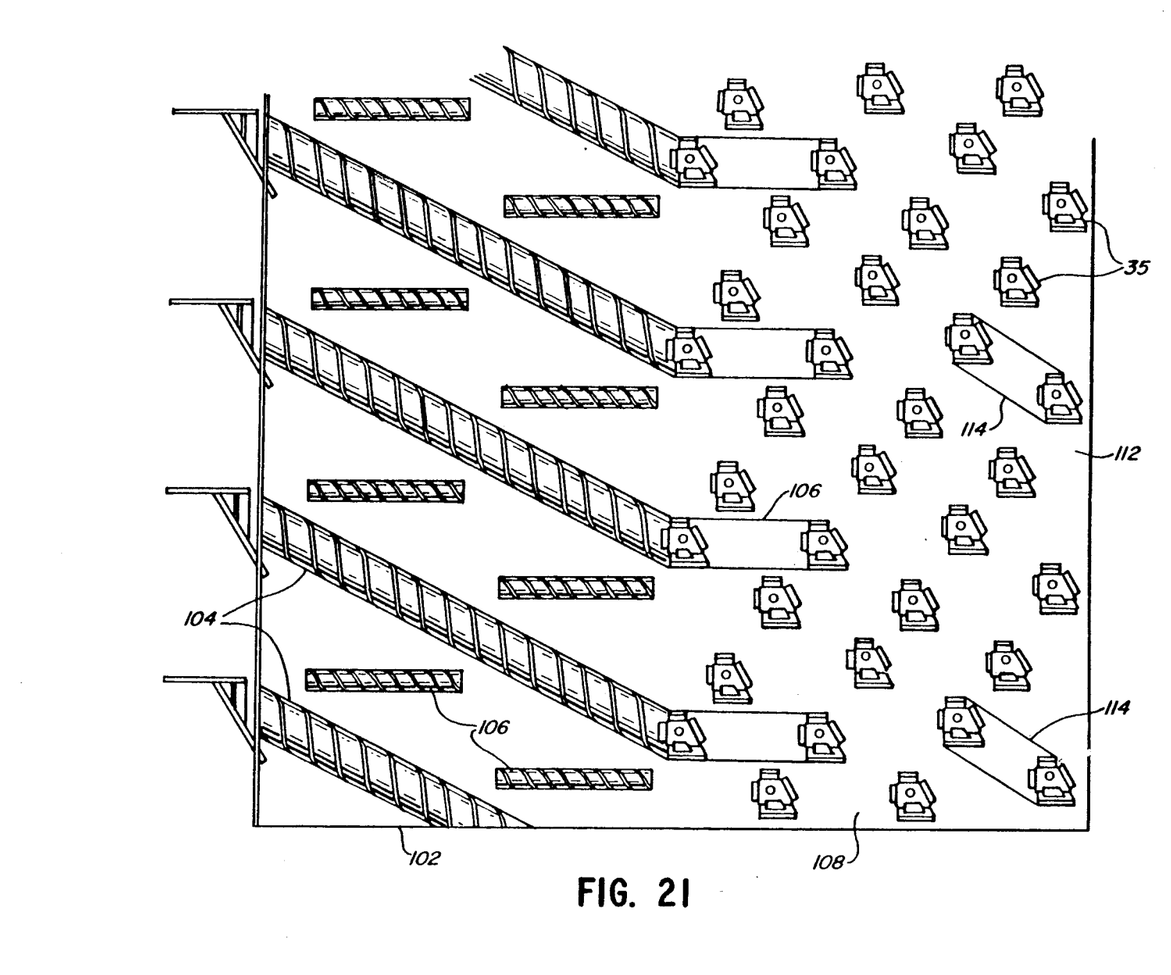

FIG. 21 uses straight bars 106 in the areas adjacent the elongated helical bars 104 and relatively short helical bars 114 adjacent to the exit end of the rotor. With this set up, the material coming off the standard part of the rotor 102 is slowed up, whereas the end of the rotor stirs up and moves the material out at a fairly rapid rate. This set-up could be used for about any crop, depending on the crop conditions. It would be commonly used for corn, beans, and grain crops.

As illustrated in FIG. 5, the various thresher elements may be readily and releasably connected to the rotor 20 in an almost limitless variety of patterns as desired or required for the most efficient threshing operations. Thus, if the crop conditions change from year to year, the weather changes, or different crops are being harvested from one field to another, an operator can make adjustments on the rotor itself, which results in great savings in time and money.

It should be understood that other shapes and forms of thresher elements than the six here described may be utilized, it being necessary only that they be releasably connectable to one or a pair of lugs as indicated. Similarly, other patterns and arrangements of the lugs 35 may be employed.

It will be readily observed from the foregoing detailed description of the invention and illustrative embodiments thereof that numerous variations and modifications may be effected by those skilled in the art without departing from the true spirit and scope of the novel concept of the principles of the invention.

What is claimed is:

1. An axial-flow rotor for a rotary threshing combine or the like comprising a generally cylindrical drum defining an outer wall portion defining an entry section and an exit section, a plurality of relatively long helically disposed and straight thresher elements disposed about the circumference of said entry section, a plurality of outwardly extending mounting means secured to the surface of said exit section of said wall portion around the entire circumference of said wall portion and forming various arrays of helical rows, circumferential rows and longitudinal rows, thresher elements interchangeably and releasably connectable to only a portion of said mounting means to form, as desired, longitudinal, circumferential, helical, or combinations of such orientations of such thresher elements to obtain for any given crop being harvested the desired threshing action by the rotor at any designated section around the circumference of the rotor in an axial direction to maximize the efficiency of the threshing and separating action, and connector means for releasably connecting said thresher elements to said mounting means, whereby the threshing combine can be used to interchangeably handle different crops quickly and easily by merely releasing the connector means and replacing and/or shifting of the existing threshing elements to different locations on the rotor by using a different portion of said mounting means, thus enabling an operator to thresh a wide variety of crops with only one rotor and a plurality of threshing elements of different sizes, shapes, surfaces, and configurations.

2. A rotor according to claim 1 wherein each of the outwardly extending mounting means comprises a lug that defines an opening in the top surface thereof, each of said thresher elements defines an inner surface of substantially complementary configuration with said lugs and a connector-receiving opening between said inner surface and the outer surface thereof, and said connector-receiving opening being in registry with said lug opening when the thresher element is operationally positioned on one of said lugs.

3. A rotor according to claim 2 in which said connector means comprises threaded bolts and nuts, each of said lugs comprising an opening in a wall thereof to provide access for connecting and disconnecting a paired nut and bolt.

4. A rotor according to claim 2 wherein said thresher elements comprise short straight bars having a rasp outer surface, each of said short straight bars being connectable to a single lug.

5. A rotor according to claim 4, wherein said short straight bars comprise a spike projecting integrally from said rasp outer surface.

6. A rotor according to claim 2 wherein said thresher elements comprise elongated straight bars having a pair of said inner surfaces and connector-receiving openings, said elongated straight bars being connectable to a longitudinally aligned pair of said lugs.

7. A rotor according to claim 6 wherein said elongated straight bars comprise a rasp on the outer surface thereof.

8. A rotor according to claim 2 wherein said thresher elements comprise elongated helical bars having a pair of said inner surfaces and connector-receiving openings, said helical bars being connectable to a helically aligned pair of said lugs.

9. A rotor according to claim 8 wherein said helical bars comprise a rasp on the outer surface thereof.

10. An axial-flow rotor for a rotary threshing combine or the like comprising a generally cylindrical drum defining an outer wall portion, a plurality of outwardly extending mounting means secured to the surface of said wall portion around the entire circumference of said wall portion and forming various arrays of helical rows, circumferential rows and longitudinal rows, thresher elements interchangeably and releasably connectable to only a portion of said mounting means to form, as desired, longitudinal, circumferential, helical, or combinations of such orientations of such thresher elements to obtain for any given crop being harvested the desired threshing action by the rotor at any designated section around the circumference of the rotor in an axial direction to maximize the efficiency of the threshing and separating action and connector means for releasably connecting said thresher elements to said mounting means, whereby the threshing combine can be used to interchangeably handle different crops quickly and easily by merely releasing the connector means and replacing and/or shifting of the existing threshing elements to different locations on the rotor by using a different portion of said mounting means, thus enabling an operator to thresh a wide variety of crops with only one rotor and a plurality of threshing elements of different sizes, shapes, surfaces, and configurations.

11. A rotor according to claim 10 wherein each of the outwardly extending mounting means comprises a lug that defines an opening in the top surface thereof, each of said thresher elements defines an inner surface of substantially complementary configuration with said lugs and a connector-receiving opening between said inner surface and the outer surface thereof, and said connector-receiving opening being in registry with said lug opening when the thresher element is operationally positioned on one of said lugs.

12. A rotor according to claim 11 in which said connector means comprises threaded bolts and nuts, each of said lugs comprising an opening in a wall thereof to provide access for connecting and disconnecting a paired nut and bolt.

13. A rotor according to claim 11 wherein said thresher elements comprise short straight bars having a rasp outer surface, each of said short straight bars being connectable to a single lug.

14. A rotor according to claim 13, wherein said short straight bars comprise a spike projecting integrally from said rasp outer surface.

15. A rotor according to claim 11 wherein said thresher elements comprise elongated straight bars having a pair of said inner surfaces and connector-receiving openings, said elongated straight bars being connectable to a longitudinally aligned pair of said lugs.

16. A rotor according to claim 15 wherein said elongated straight bars comprise a rasp on the outer surface thereof.

17. A rotor according to claim 11 wherein said thresher elements comprise elongated helical bars having a pair of said inner surfaces and connector-receiving openings, said helical bars being connectable to a helically aligned pair of said lugs.

18. A rotor according to claim 17 wherein said helical bars comprise a rasp on the outer surface thereof.

19. A rotor according to claim 1 in which the outwardly extending mounting means are disposed in a plurality of uniformly spaced, axially extending, circumferentially spaced rows throughout at least the exit portion of said rotor.

20. A rotor according to claim 19 in which rows of outwardly extending mounting means are located throughout the entire length of the rotor.

* * * * *